COLOR TELEVISION RECEIVER

Filed Feb. 13, 1953 5 Sheets-Sheet 1

INVENTOR.

ALFRED C. SCHROEDER

BY Olin J. Mitchell

ATTORNEY

INVENTOR.
ALFRED C. SCHROEDER
BY Leo V. Mitchell
ATTORNEY

Oct. 28, 1958 A. C. SCHROEDER 2,858,366

COLOR TELEVISION RECEIVER

Filed Feb. 13, 1953 5 Sheets-Sheet 3

INVENTOR.
ALFRED C. SCHROEDER
BY Olin [signature]
ATTORNEY

Oct. 28, 1958 | A. C. SCHROEDER | 2,858,366

COLOR TELEVISION RECEIVER

Filed Feb. 13, 1953 | 5 Sheets-Sheet 4

INVENTOR.

ALFRED C. SCHROEDER

BY [signature]

ATTORNEY

Oct. 28, 1958 A. C. SCHROEDER 2,858,366

COLOR TELEVISION RECEIVER

Filed Feb. 13, 1953 5 Sheets-Sheet 5

INVENTOR.

ALFRED C. SCHROEDER

BY Olin D. Mitchell

ATTORNEY

United States Patent Office 2,858,366
Patented Oct. 28, 1958

2,858,366

COLOR TELEVISION RECEIVER

Alfred C. Schroeder, Huntingdon Valley, Pa., assignor to Radio Corporation of America, a corporation of Delaware Application February 13, 1953, Serial No. 336,755

16 Claims. (Cl. 178—5.4)

The present invention relates to a new and improved color television receiver which is adapted to reproduce a color image by means of an image-reproducing tube having only a single electron gun, such, for example, as the kinescope disclosed and claimed in U. S. Patent 2,446,791, granted to the applicant herein, Aug. 10, 1948, and assigned to the assignee of the present invention.

More particularly, the invention relates to a color television receiver capable of receiving any one of a great variety of signals of the type generically known and referred to in the art as a "color subcarrier" signal and converting such signal to one which may be applied to a reproducer so that it may reproduce the information as to color and brightness through the agency of a single-gun.

It has been proposed, in general, that information regarding a color image be transmitted by electrical signals such that the brightness or "luminance" of the image (i. e. the black and white information) is employed to modulate a main carrier wave, while the color information is conveyed by a "subcarrier" which is phase-modulated in accordance with the hue of the image and amplitude-modulated as a function of color saturation. Thus, the resultant composite signal is designated as a so-called "color subcarrier" type signal.

In order for the above-described "color subcarrier" type signal to be translated into a visible image on the face of a kinescope, of the type shown in the cited patent, it is essential for the signal to be in such form that it may be "sampled" sequentially so that information regarding each of the primary colors may be extracted therefrom at exactly the proper instant. This is necessitated by the operation of the tube wherein the single electron beam is keyed on at discrete intervals successively, such that, for example, each keying of the beam occurs at an instant when the signal contains information regarding a particular color.

Originally, it was proposed that both the luminance and color signals comprising the total transmitted information be in "symmetrical" form, that is, with the respective quantities of the primary colors making up the luminance signal being equal to each other and with the color subcarrier having three equally displaced phases (i. e., 0°, 120° and 240°). With the composite signal in such symmetrical form, it is apparent that its application to other sequentially operated kinescopes such as a "single-gun" tube presents no problems, since the signal is necessarily going through zero as to two of the primary colors while the third is being reproduced. Thus, the composite symmetrical signal may be applied to the grid of the single-gun kinescope and the cathode keyed by pulses occurring equally spaced in time and at three times the subcarrier frequency, so that every third pulse would permit the signal corresponding to one color to produce beam current, while the signals corresponding to the other two colors are going through zero at the same instant. Further, in accordance with the operation of one form of sequential color kinescope, it is necessary that the screen be "switched" in synchronism with the keying pulses so that at the instant that the electron beam is modulated by a signal of one color (green, for example) it will strike the color phosphor corresponding to that color (green). By reason of the high frequency of sharp-pulse sampling, it will be recognized that the most practicable switching medium is a sinusoidal voltage. Sine wave switching broadly does not constitute part of the present invention but is disclosed and claimed in the copending application of Paul K. Weimer, S. N. 134,453, filed December 22, 1949. In brief, with a symmetrical system the sine wave voltage would be such that it crosses the zero axis at the time of one color (i. e. the color requiring no deflection of the electron beam at the screen), has the proper amplitude at 120° to make the beam strike the phosphor area of another color and the proper amplitude at 240° to deflect the beam to the phosphor area of the third color.

There has, however, been proposed a color television signal falling within the generic type set forth above, which is known as a "constant luminance" signal. This system is set forth in detail in an article entitled "Principles of NTSC Compatible Color Television," by Hirsch et al., February 1952, "Electronics." According to this proposal, the luminance signal is not symmetrical but is composed of unequal proportions of the green, red and blue reproducing primaries in the percentage contributed by each to the luminance of white. Also, the color information is transmitted by amplitude-modulating two phases of a sine wave which are displaced 90° with, for example, the red and blue "color-difference" signals (e. g. $E_R-E_Y$ and $E_B-E_Y$), respectively. Since the brightness or luminance signal contains information as to all three primary colors, the third color difference signal may be derived at the receiver by addition of the two detected color difference signals. Thus, while the NTSC proposed signal is advantageous in the sense that it causes interference to appear as a chromaticity fluctuation (to which the eye is not very sensitive) rather than a brightness fluctuation, its reproduction with a "sequential" type of kinescope has heretofore been thought to be out of the question, in view of its asymmetry.

It is, therefore, a primary object of the present invention to provide means for converting an asymmetrical color television signal of the above-described "color subcarrier" type to one which is capable of reproduction by a sequential type imagine-reproducing device.

In general, the present invention contemplates means for deriving from an asymmetrical "color subcarrier" type signal a new brightness signal such that when the color signal is superimposed thereon, it will be going through zero as to two of the component colors at the instant that the third color is being sampled by the kinescope. Those skilled in the art will recognize the fact that the color signal, as the term is employed herein, constitutes the resultant of the signals as to the three separate colors, which may, for example, be derived from individual cameras. According to one aspect of the invention, an asymmetrical signal may be acted upon in such fashion as to render it symmetrical as to both its luminance component, and its color signal. Thereupon, it may be applied to the control electrode of a "sequential" type image reproducer of the type shown in the above-cited Schroeder patent, and a sine wave may be used for switching the electron beam modulated thereby to the various color phosphors, as described and claimed in the Weimer application referred to above. It has also been found, moreover, that the asymmetrical signal need not be converted to a symmetrical form but that it need only be changed to such form whereby the color signal goes through zero as to two of the component colors at the time that the third color is being "sampled" by the kinescope. In the practice of this aspect of the invention, the sine wave switching voltage is also changed to one having the proper amplitude and phase such that it has a predetermined positive value at the time that the electron beam is to be deflected to phosphors of one color, a predetermined negative value at the instant the beam is to be deflected to phosphors of a second color, and is going through zero when the beam is directed without deflection to phosphors of the third color.

Hence, it is a principal object of the invention to provide means for converting an asymmetrical brightness signal to one which provides the necessary axis for a color signal superimposed thereon to go through zero as to two of the component colors at the time the third is being sampled.

More specifically, it is an object to provide means for changing the values of the several components of an asymmetrical brightness signal to new values, whereby to produce a new brightness signal having proper levels for enabling a superimposed color signal to be sampled sequentially.

The above objects may be viewed in two ways, depending upon whether, on the one hand, the received asymmetrical signal is to be converted to a completely symmetrical one prior to being applied to the sequential kinescope or, on the other hand, is to be changed to one which may be sampled by the kinescope by means of a new switching voltage.

Thus, in accordance with the first aspect, it is another object to provide means for deriving a new brightness signal wherein each of the color components is equal to one-third of unity (for assumed unity signal). Further, in this regard, it is an object of the invention to provide means for converting an asymmetrical color signal to a form wherein the three color components thereof are exactly 120° displaced in phase.

Where the invention is to be practiced in a manner not requiring conversion to a symmetrical system, it is an object to provide means for developing a new set of constants for an asymmetrical brightness signal, whereby to render the same a suitable axis for an asymmetrical color signal so that the latter may be sequentially sampled in a kinescope.

Still another object is the provision of a new and useful receiver demodulation arrangement having the advantage of simplicity, by virtue of its requiring only a single demodulator.

A still further object is to provide means for developing a sinusoidal switching voltage which, by reason of a particular D. C. bias supplied to it, is capable of switching the deflection of an electron beam modulated by an asymmetrical color signal.

Additional objects and advantages of the present invention will become apparent to persons skilled in the art from a study of the following detailed description of the accompanying drawings, in which.

Figures 1, 9:
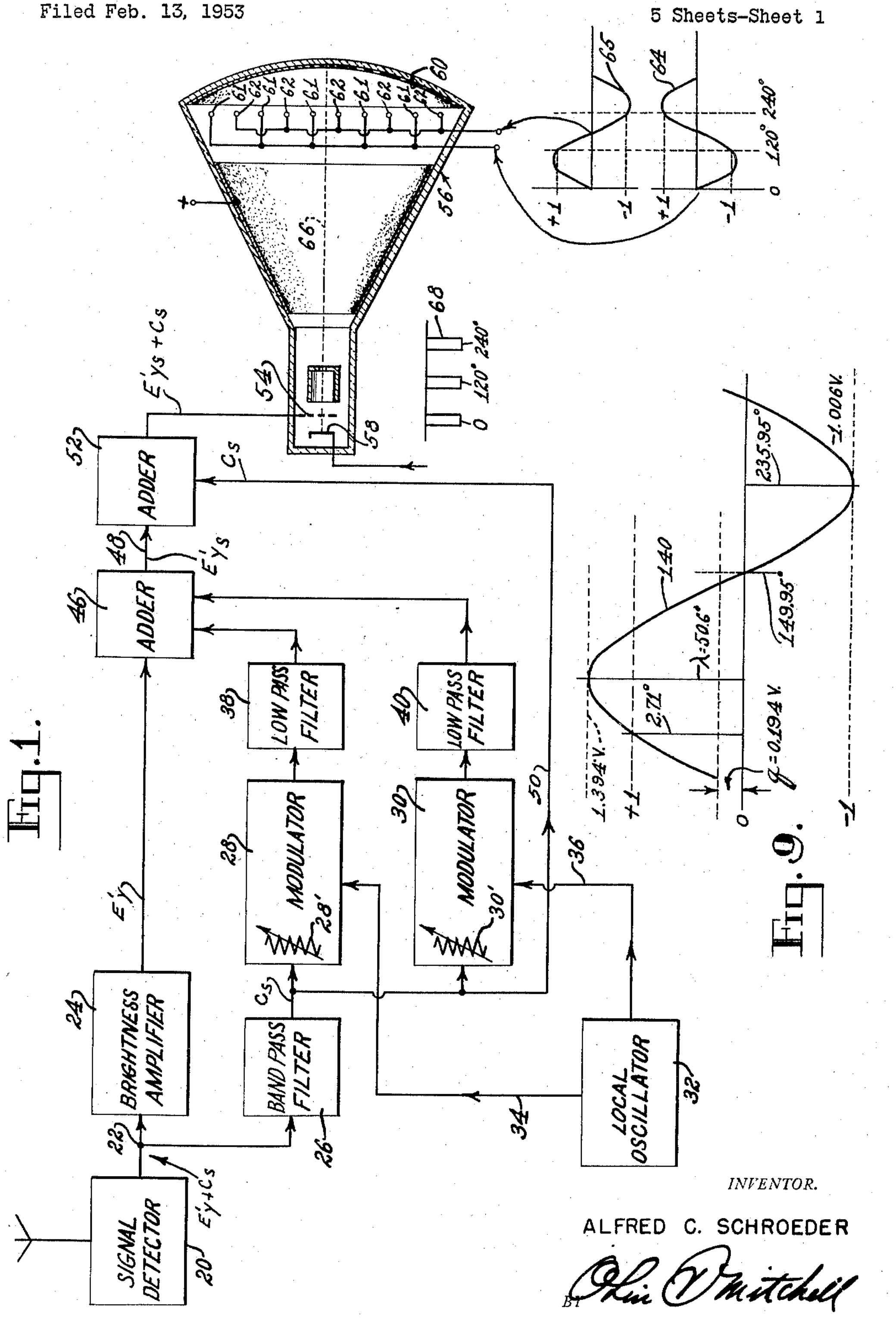
Fig. 1 is a block diagram illustrating a form of the invention adapted for use in converting an asymmetrical brightness signal to symmetrical form.
Figures 2, 3:
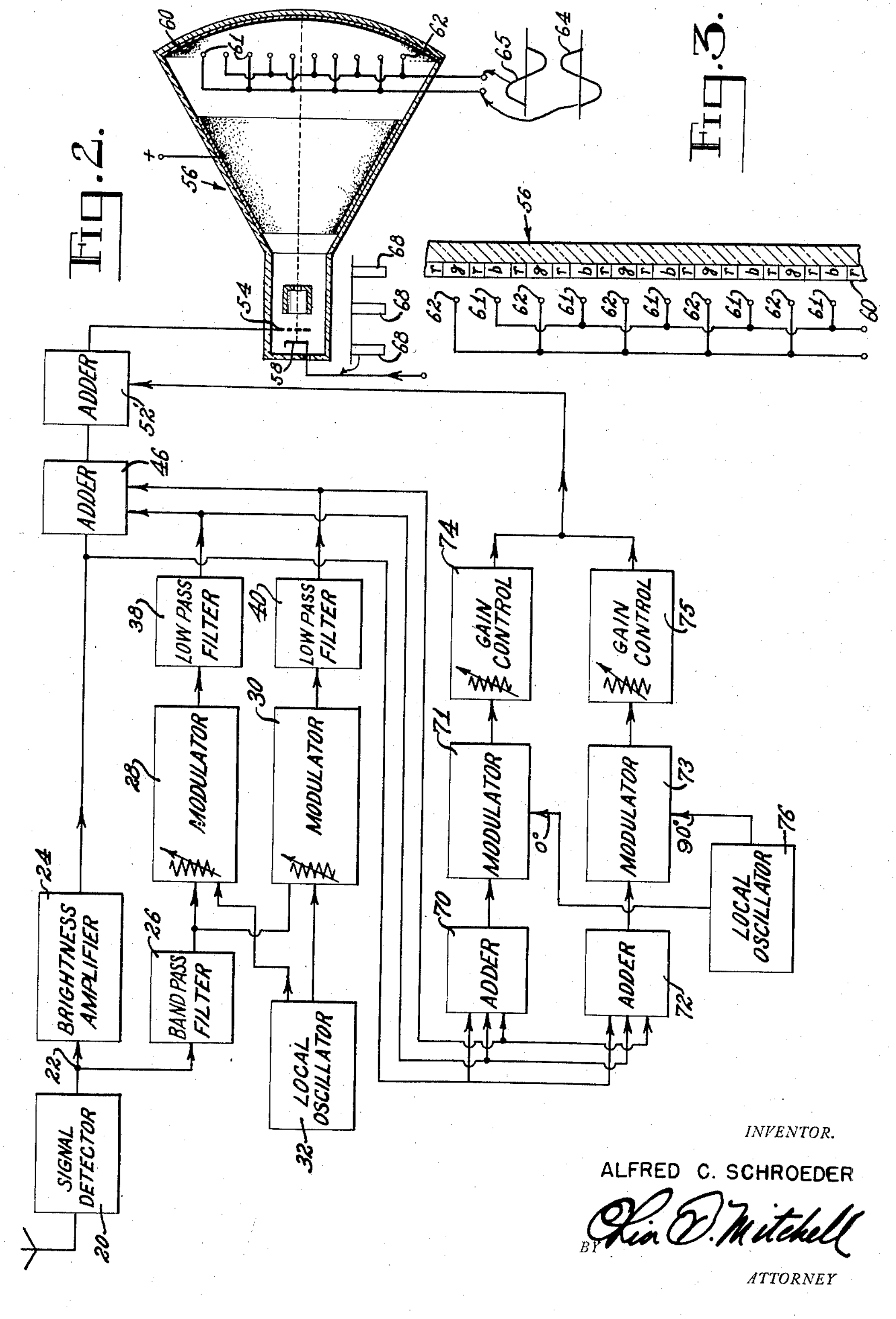
Fig. 2 illustrates, by way of block diagram, a modification of the invention shown in Fig. 1, whereby an asymmetrical color signal is changed to a symmetrical one.
Figure 4:
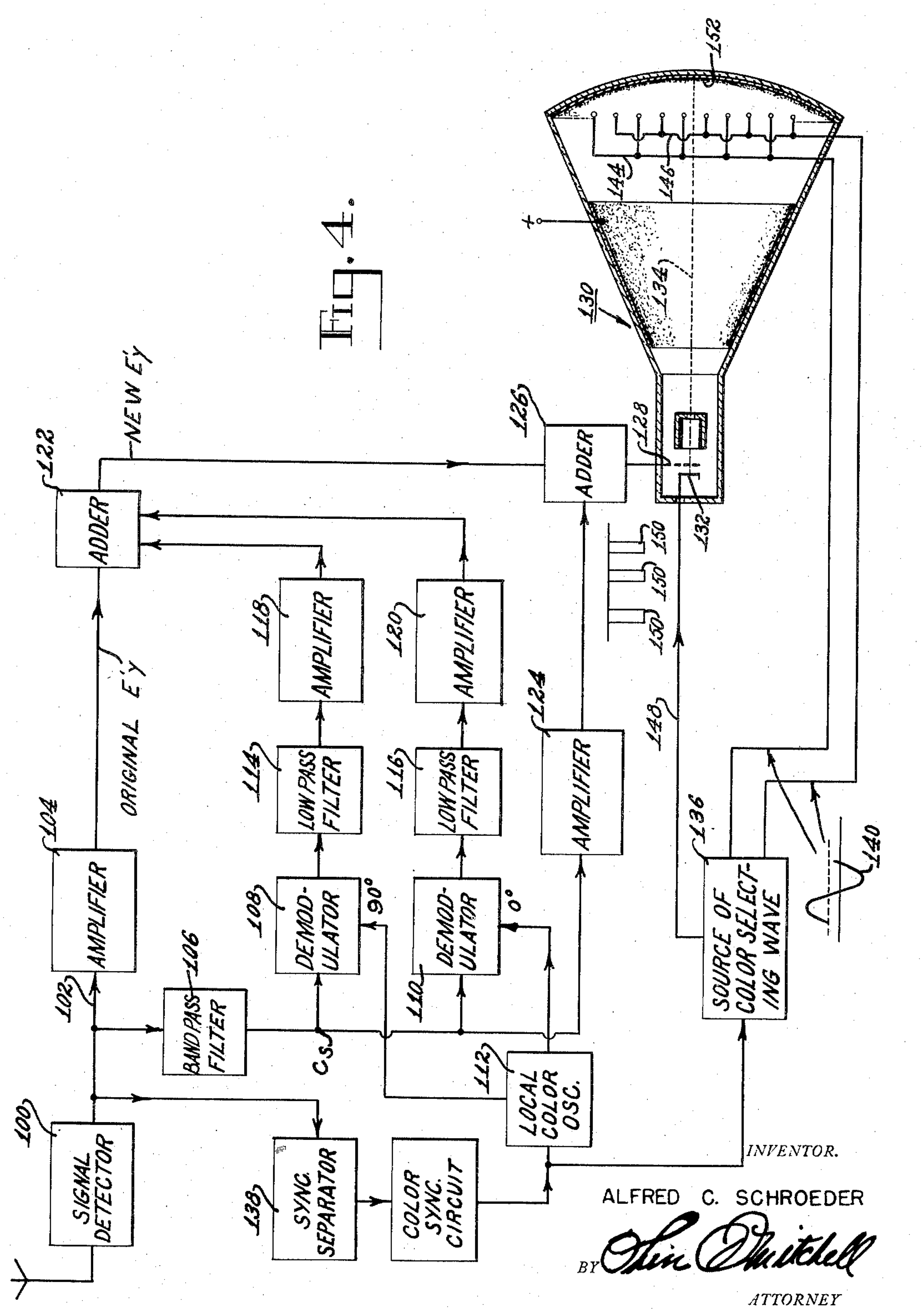
Figure 5:
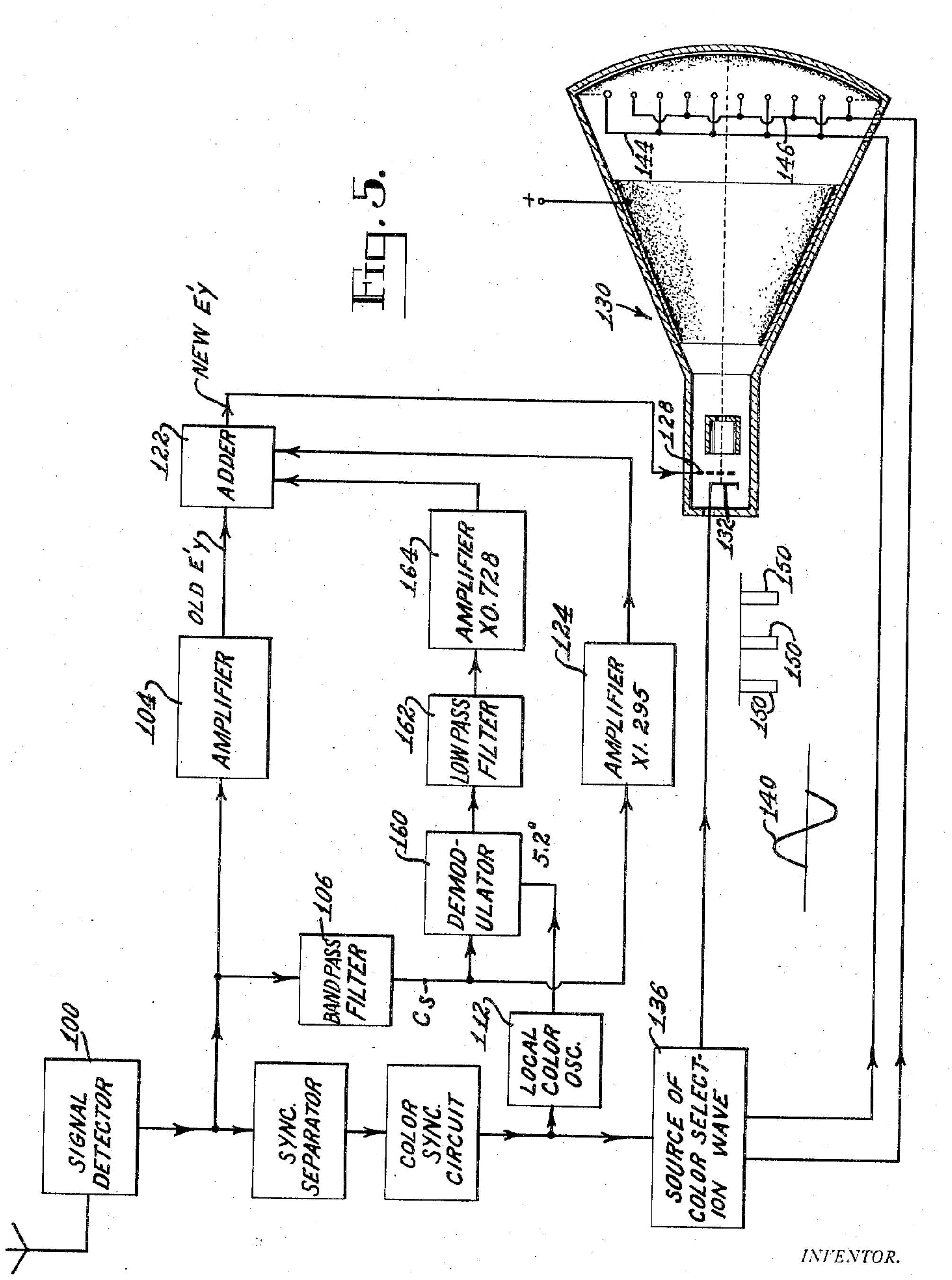
Figures 6, 7, 8:
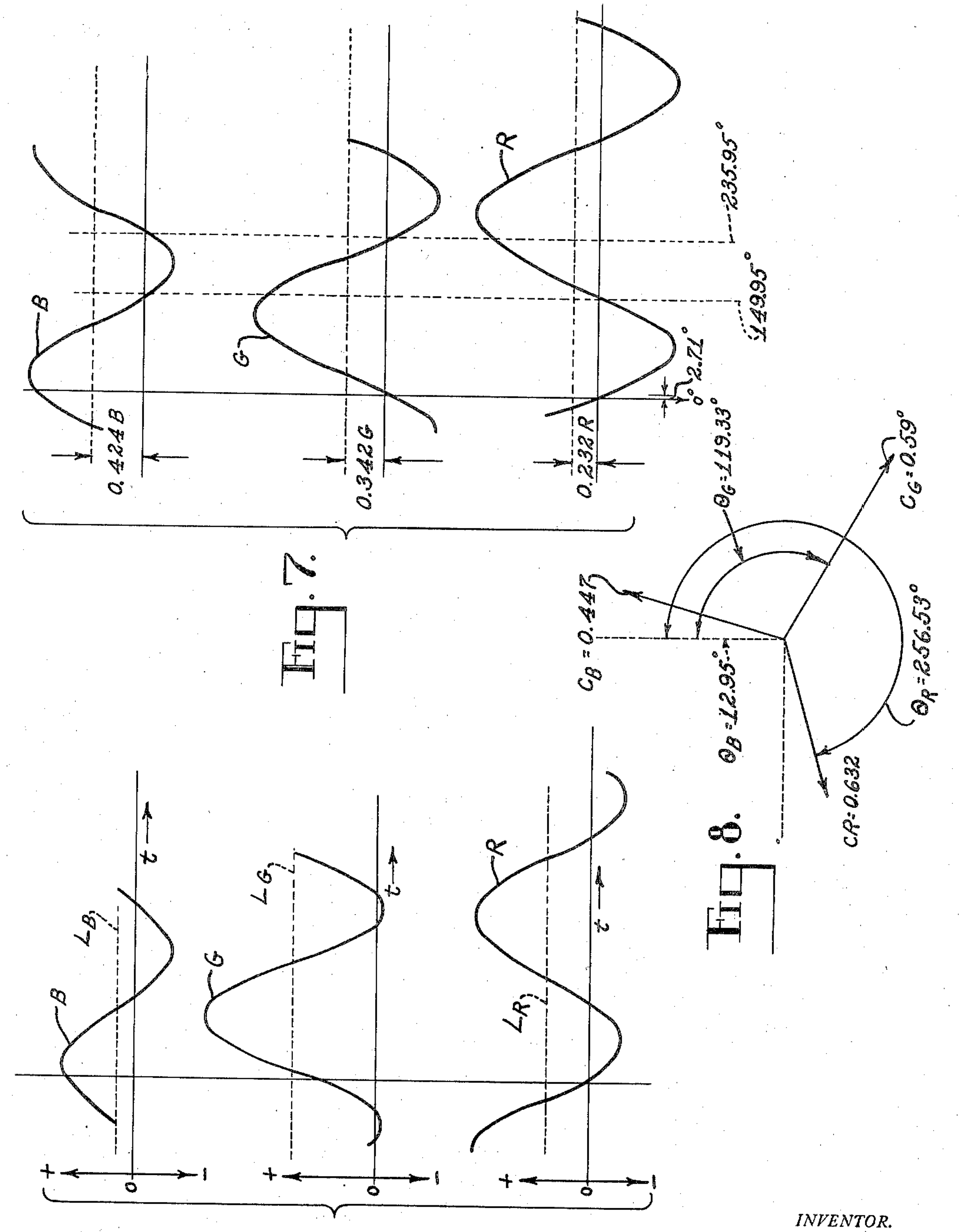

Fig. 3 is a diagrammatic showing of the "screen switching" means of one type of sequential, single-gun color kinescope, as disclosed and claimed in U. S. Patent 2,446,791;

Fig. 4 is a block diagram of another embodiment of the invention, in which an asymmetrical luminance and color signal are converted to a new form capable of sequential sampling;

Fig. 5 illustrates, by block diagram, a modification of the invention of Fig. 4;

Figs. 6, 7 and 8 illustrate certain waveforms to which reference is made in the description of the invention; and Fig. 9 illustrates a "screen switching" voltage waveform developed in accordance with the circuitry of Figs. 4 and 5 for use with a screen of the type shown in Fig. 3.

Referring to the drawings and, particularly, to Fig. 1 thereof, there is disclosed a signal detector 20 which may be any type known in the art suitable for the reception and detection of a "simultaneous subcarrier" signal. At the output 22 of signal detector 20, there is available the composite brightness signal $E_y'$ and color subcarrier $C_s$. The brightness information is selected and amplified by a suitable amplifier 24 having such a response characteristic as to cut off the color subcarrier frequency which may, for example, be 3.6 megacycles displaced from the luminance carrier frequency. For purposes of illustration, it may be assumed that the brightness signal is in accordance with certain standards which have been proposed by the NTSC, so that it may be expressed as:

$$E_y'=0.59G+0.30R+0.11B$$

As has been stated above, it is apparent that the coefficients of the red, green and blue components are far different from the symmetrical form heretofore considered essential for application to a sequential-type color reproducer. The color signal $C_s$, on the other hand, is in this instance assumed to be symmetrical—i. e. of the type wherein the three color signals modulated equally spaced phases of a color subcarrier. A band pass filter 26, which may have a 2.5 to 4 megacycle response, is also connected to terminal 22 at the output of the signal detector and will, therefore, select the color subcarrier information $C_s$.

Thus, the problem, insofar as the arrangement of Fig. 1 is concerned, may be stated as requiring the derivation of a symmetrical brightness signal, having the following coefficients, from the above-noted asymmetrical expression:

$$E_{ys}'=0.33G+0.33R+0.33B$$

In other words, it is required, for the conversion from $E_y'$ to $E_{ys}'$, that the following be added to the received asymmetrical signal:

$$0.03R-0.26G+0.22B$$

The color signal, which is to supply this differential to the original brightness signal, is applied to two demodulators 28 and 30 which may be of any conventional type, such as described in the cited Hirsch et al. article in "Electronics," for heterodyning the color subcarrier with oscillations of the same frequency. A local oscillator 32 furnishes to the demodulators 28 and 30 through couplings 34 and 36, respectively, 3.6 megacycle oscillations which may be 120° displaced, in view of the symmetry of the color signal. Although not shown specifically, the two phases of the 3.6 mc. wave may be produced by means of any conventional form of phase-splitter, such as delay lines, which are well known in the art.

In order for the asymmetrical brightness signal to be changed to a symmetrical one, therefore, it will be appreciated that the differential between the two must be supplied by the demodulators 28 and 30. This may be effected, for example, by applying to demodulator 28 (which, for purposes of illustration, is considered the red "color difference" demodulator) a reference wave having the same phase as the phase of the subcarrier which was modulated by the red color difference information. Thus, the output of demodulator 28, after passing through the low pass filter 38, will be the red color difference signal multiplied by some factor. Similarly, demodulator 30 may be assumed to be the blue "color difference" demodulator and may, therefore, be furnished with a reference wave corresponding to the phase of the subcarrier which was modulated thereby at the transmitter, so that the output of low pass filter 40 will contain a factor times the blue "color difference" information.

Specifically, the output of filter 38 should contain the information $X(R-E_y')$ and the output of filter 40 should be $Z(B-E_y')$. The factors "X" and "Z" are determined from the relationship:

$$0.03R-0.26G+0.22B=X(R-E_y')+Z(B-E_y')$$

wherein, as stated above, the quantity on the left of the equality sign is the differential which is to be supplied to the original brightness signal $E_y'$. This relationship may be solved for "X" and "Z" which are the gains, respectively, of demodulators 28 and 30 and which may conveniently be afforded through proper setting of the gain controls 28' and 30' shown diagrammatically as being associated with the demodulators 28 and 30.

The output of filter 38, namely, $X(R-E_y')$, and the output $Z(B-E_y')$ of filter 40 are fed via leads 42 and 44, respectively, to an adder 46, which may be in the conventional form of common load impedance. Also connected to adder 46 is the output of the brightness amplifier 24, carrying the original $E_y'$ signal, so that, at the output lead 48 of the adder, there is available a new brightness signal $E_{ys}'$ in symmetrical form, as follows:

$$E_{ys}'=0.33G+0.33R+0.33B$$

As shown in Fig. 1, the symmetrical color signal $C_s$ is coupled via lead 50 to an adder 52. Also fed to adder 52 is the new brightness signal $E_{ys}'$ in the form noted above, so that this adder performs the addition of the new brightness signal and the color signal. From the foregoing, it will be recognized that the resultant $E_{ys}'+C_s$ is entirely symmetrical and may be applied directly to the control electrode 54 of a single gun color kinescope 56. The kinescope further includes a cathode 58, a color phosphor screen 60 and beam switching means 61, 62 which may be in the form of wire grilles, as described in the Schroeder patent noted supra. Fig. 3 illustrates, in an enlarged fashion, the color phosphor screen 60 which comprises red, green, and blue phosphors indicated by reference characters "*r*," "*g*" and "*b*," and the screen switching electrodes comprising conductors 61 and 62. A suitable source of sinusoidal voltage (not shown) should be provided for supplying to the conductors 61 a voltage such as is illustrated in Fig. 1 at 64, and an oppositely phased voltage 65 to conductors 62. These voltages are of such value as to have the proper magnitude (indicated as unity in the drawing) at 120° to cause an electron beam 66 to be deflected toward the green phosphors "*g*," the opposite sign at 240° for deflecting the beam toward the blue phosphors "*b*" and zero at 360° for permitting the beam to travel without deflection toward the red phosphors "*r*." Simultaneously with this beam deflecting or "switching" action, the cathode 58 is keyed with negative pulses 68 (at 0°, 120° and 240°) in order to cause "bursts" of electrons to be emitted sequentially therefrom, as will be understood from the operation of the tube. Since the pulses 68 and switching voltages 64 and 65 are timed to occur at 0°, 120° and 240°, which are the angles of the symmetrical color signal $C_s$ (which is superimposed on the new symmetrical brightness signal $E_{ys}'$), the kinescope 56 serves effectively as a "sharp pulse" sampling device to extract sequentially from the combined signal the respective green, blue and red color information.

While the specific embodiment disclosed thus far has been described as including demodulating with two phases of a reference wave displaced 120°, it will be understood that the same result could have been accomplished through the use of different "desampling" angles. This concept is described and claimed by the present applicant in his copending application S. N. 213,002, filed Feb. 27, 1951, for "Color Television." Briefly, it may be explained on the basis that, regardless of the specific phases employed in modulating the color subcarrier at the transmitter, the subcarrier can contain only two pieces of information, namely, phase and amplitude, at any given instant. Hence, by proper selection of their gains the demodulators 28 and 30 may be operated with any two phases and made to produce a resultant wave (when combined by the adder 46) which has the same instantaneous phase and amplitude as that which would have resulted from the use of symmetrically displaced desampling angles. Hence, applicant does not limit the scope of this aspect of his invention to the demodulating angles specified above by way of illustration.

Further, it should be noted that, despite the showing of two separate adders 46 and 52, the functions of the two may be effected by a single adder, in view of the fact that the output of adder 46 is combined with that of adder 52. The separate adders, in other words, are shown in order to clarify the meaning of their operation.

The embodiment shown in Fig. 2 is intended to illustrate the utility of the present invention in accommodating a fully asymmetrical signal (i. e. asymmetrical brightness and asymmetrical color subcarrier) to a sequential tube by converting both the brightness information and color subcarrier to symmetrical form. Hence, the problem in this case may be treated in two parts, that is, the derivation of a new brightness signal and the derivation of a new color subcarrier. It should be apparent from the description of Fig. 1, that the derivation of a new brightness signal having symmetrical values for the red, green and blue components may be effected through the agency of apparatus similar to that employed in the preceding embodiment. In view of this parallelism, the reference numerals pointing out the various elements of Fig. 2 will be identical, where the parallel exists, to those used in Fig. 1. More particularly, therefore, the receiver of Fig. 3 comprises a signal detector 20, adapted to receive and detect a composite signal $S_T$ having the form, by way of illustration, of $$S_T=0.59G+0.30R+0.11B+C_s \text{ (asymmetrical)}$$

where the color signal was derived by modulating quadrature components of a subcarrier with the red and blue color difference information, rather than three equally displaced phases. The output terminal 22 of signal detector 20 is coupled to a brightness amplifier 24 which amplifies the brightness signal and supplies it to the input of adder 46. The composite detected signal is also fed to a band pass filter 26 which selects the color subcarrier and applies it to the two demodulators 28 and 30. These demodulators are also supplied through leads 34 and 36 with quadrature components of the local reference wave generated by the local sampling oscillator 32. As was explained in detail in the description of Fig. 1, the gains of demodulators 28 and 30 are so adjusted as to produce at the output terminals of low pass filters 38 and 40, respectively, signals bearing the information $X(R-E_y')$ and $Z(B-E_y')$, where X and Z are the individual gains of the demodulators necessary for supplying the difference between the asymmetrical $E_y'$ and a symmetrical signal $E_{ys}'$. These quantities $X(R-E_y')$ and $Z(B-E_y')$ are combined with $E_y'$ in adder 46 to produce a symmetrical brightness form $E_{ys}'$. Up to this stage, the operation of the circuit under consideration has been quite similar to that of the arrangement of Fig. 1. The remainder of the block diagram of Fig. 2, as will appear hereinafter, serves to derive from the asymmetrical color signal a new color signal which goes through zero as to two of the component colors at the time that the third is at unity value, these times being spaced 120° apart.

The principle underlying this conversion of the asymmetrical color subcarrier signal to symmetrical form is described in detail in applicant's co-pending application, S. N. 213,002, filed Feb. 27, 1951, cited above. In general, however, it contemplates the fact that, where two out-of-phase sine waves are added, the resultant sine wave will lie somewhere between the two original waves, so that a sinusoidal voltage of any desired phase and amplitude may be developed through the addition of two properly phased waves of having the requisite amplitude. Specifically, therefore, the circuit of Fig. 2 includes two adders, 70 and 72, each of which is connected to the output terminals of the brightness amplifier 24 and low pass filters 38 and 40. The output of adders 70 and 72 are coupled, respectively, to modulators 71 and 73 which have associated therewith gain controls 74 and 75. These modulators may also be of the synchronous type comprising electron tube having two or more control electrodes such that two waves of equal frequency may beat with each other therein, according to the well known operation of "zero-beating" or "homodyning." A suitable source of alternating current energy 76, indicated in the drawing as a separate local oscillator (but which may, in practice, employ the output of the above-described oscillator 32) is connected to the modulators 71 and 73, through some phase-splitting means (not shown), in order to provide them with desired phases of a subcarrier frequency wave. For purposes of illustration, these are shown as 0° and 90° phases being applied to modulators 71 and 73, respectively. As shown, moreover, the outputs of the two modulators, after suitable gain, are combined and applied to one terminal of the adder 52' for addition with the symmetrical brightness signal available at adder 46.

Thus, in operation, each of the adders 70 and 72 is supplied with the amplified brightness signal $$M(0.59G+0.30R+0.11B)$$

where M is the gain of amplifier 24, the red demodulator output $X(R-E_y')$ and the blue demodulator $Z(B-E_y')$. Since it is ultimately desired that the color signal be in the form $$0.67R\cos\omega_s t+0.67G\cos(\omega_s t-120°)+0.67B\cos(\omega_s t-240°)$$

the gain of adders 70 and 72 may be adjusted so that their outputs are, respectively, as follows:

Output of adder 70$=R-0.5B-0.5G$
Output of adder 72$=0.86B-0.86G$

These quantities are then employed to modulate the subcarrier frequency waves applied to modulators 71 and 74, to produce the color signal in the above symmetrical form. The new color signal is, as illustrated, superimposed on the symmetrical brightness signal $E_{ys}'$ in adder 52' and the resultant is applied to the control grid 54 of kinescope 56. The operation from this point on is just as was described for Fig. 1 with switching voltages 64 and 65 being applied to grilles 61 and 62, respectively, and a series of keying pulses 68 being applied to the cathode 58. Further, insofar as Fig. 2 is concerned, it should be borne in mind that the modulation angles disclosed are merely exemplary, as was discussed in connection with the operation of Fig. 1. Also, the function of adder 52' could be performed by adder 46, since the former merely adds the new color signal to the output of the latter.

At this point, note should be taken of the fact, as set forth above, that the present invention, in its second aspect, renders unnecessary the conversion of a "constant luminance" or other asymmetrical signal to symmetrical form. Stated otherwise, the applicant herein has found that an asymmetrical "simultaneous subcarrier" signal may be adapted to use with a "sequential" image reproducer by deriving a new brightness signal which serves to "support" the color signal in such manner that the color signal goes through zero as to two of the component colors as the third is of unity value. In accordance with this principle, the color signal is not remade to fit a symmetrical pattern but is merely amplified by a predetermined factor, as will appear more fully below, and the color information is "sampled" by the kinescope through the agency of a set of asymmetrical keying and beam-switching voltages. The determination of the amplitudes and angles of these voltages is made by solving certain equations which depend upon the constants of the transmitted and received signal for their solution.

The problem inherent in attempting to translate asymmetrical signal into a color image by means of a sequentially operating device may be most readily understood by referring to Fig. 6. As persons skilled in the art will recognize, the waveforms B, G and R thereof represent the blue, green and red color signals of an asymmetrical system which, for purposes of explanation, is in the form of the NTSC compatible signal described. Thus, curve B is indicative of the blue color signal and dotted line $L_B$ represents its D. C. level of 0.11. Similarly, curve G is the green color signal superimposed on a D. C. axis $L_G$ of 0.59, while the red color signal R is carried by a D. C. axis $L_R$ equal to 0.30. Thus, it may be seen that, by virtue of the phase relationship between the waveforms B, G and R, there is no instant at which two of them are going through zero. This, therefore, points out the necessity for developing a new brightness signal in order for the color signals to be sampled sequentially by the image-reproducing device.

Hence, in order that the principles of this second aspect of the present invention may be more readily apparent, it is desirable to analyze the true significance of the "compatible" signal proposed by the NTSC, as set forth above.

Assume that G, R and B are the three "gamma-corrected" color signals, from three color pickup devices, which are to be transmitted, and that $G_L$, $R_L$ and $B_L$ are the low frequency components, while $G_H$, $R_H$ and $B_H$ are the high frequency components thereof. Then, if for example, the green lows $G_L$, are sampled, the useful output of the green sample after transmission and band limitations will be $$(1)\quad S_{G_L}=G_L+2G_L\cos(\omega_s t+\theta_G)$$

where $\theta_G$ is the phase of the green sampling relative to some reference phase. The outputs of the red and blue samplers may be expressed similarly, with corresponding subscripts, of course, so that the useful output of the sampler after transmission, including the "mixed highs" (as disclosed and claimed in U. S. Patent 2,554,693 granted to A. V. Bedford, May 29, 1951) is as follows:

$$(2)\quad S_T=G_L+G_H+R_L+R_H+B_L+B_H+2G_L\cos(\omega_s t+\theta_G)+2R_L\cos(\omega_s t+\theta_R)+2B_L\cos(\omega_s t+\theta_B)$$
$$=G+R+B+2G_L\cos(\omega_s t+\theta_G)+2R_L\cos(\omega_s t+\theta_R)+2B_L\cos(\omega_s t+\theta_B)$$

The first part of the above expression (2) is the sum of the three color signals, or a "brightness" signal, while the second portion is a sine wave at $\omega_s$ which is amplitude-and-phase-modulated. Thus, the expression may be rewritten in a more general form as $$(3)\quad S_T=a_G G+a_R R+a_B B+c_G G_L\cos(\omega_s t+\theta_G)+c_R R_L\cos(\omega_s t+\theta_R)+c_B B_L\cos(\omega_s t+\theta_B)$$

which is referred to hereinafter as the transmitted signal equation. Hence, by way of illustration, it may be noted that in the case where $S_T=1$ for white, the constants of the transmitted signal according to a symmetrical system would be as follows:

$$a_G=a_R=a_B=1/3$$
$$c_G=c_R=c_B=2/3$$
$$\theta_G=0°;\ \theta_R=120°;\ \theta_B=240°$$

From the foregoing, it may be seen that the color signal constitutes the following:

$$(4)\quad C_s=c_G G_L\cos(\omega_s t+\theta_G)+c_R R_L\cos(\omega_s t+\theta_R)+c_B B_L\cos(\omega_s t+\theta_B)$$

This color signal may be represented by three rotating vectors all rotating at $\omega_s$ and at the angles $\theta_G$, $\theta_R$ and $\theta_B$ and of lengths equal, respectively to $c_G G_L$, $c_R R_L$ and $c_B B_L$. Since the three vectors are added, there is one resultant which has a certain amplitude and phase. These amplitude and phase values may be determined by resolving each of the color vectors into its two components at right angles such that, by way of example, the green vector $c_G G \cos(\omega_s t+\theta_G)$ may be expressed as $$c_G G_L \cos\theta_G \cos\omega_s t + c_G G_L \sin\theta_G \sin\omega_s t$$

The other two color vectors may be broken down in like manner, so that the total color signal may be written as follows:

$$(5)\quad C_s=(c_G G_L \cos\theta_G + c_R R_L \cos\theta_R + c_B B_L \cos\theta_B)\cos\omega_s t + (c_G G_L \sin\theta_G + c_R R_L \sin\theta_R + c_B B_L \sin\theta_B)\sin\omega_s t$$

Stated otherwise, the resultant of the three vectors may also be represented as the resultant of two vectors at right angles, each modulated by a signal which is a linear combination of the three color signals. Hence, as stated earlier and explained in the above-cited "Electronics" article, the transmitted signal may be obtained by employing two, instead of three, modulators and modulating them with the $C_{cos}$ and $C_{sin}$ signals. These can be obtained at the transmitter by a masking amplifier, that is, an amplifier which can cross-connect between all of the color signals with either polarity and any amplitude, an example of which is disclosed and claimed in U. S. Patent 2,566,693, granted Sept. 4, 1951, to W. H. Cherry for "Color Television System" and assigned to the assignee of the present invention.

*Analysis of a color receiver*

The transmitted signal stated as Equation 3 above may be expanded by writing $G_L$ or $G_H$ more fully $$G_L \text{ or } G_H = G\cos(\omega_G t+\mu_G)$$
$$R_L \text{ or } R_H = R\cos(\omega_R t+\mu_R)$$
$$B_L \text{ or } B_H = B\cos(\omega_B t+\mu_B)$$

so that the transmitted signal becomes $$(6)\quad S_T=a_G G\cos(\omega_G t+\mu_G)+a_R R\cos(\omega_R t+\mu_R)+a_B B\cos(\omega_B t+\mu_B)+\tfrac{1}{2}\{c_G G\cos[(\omega_s-\omega_G)t+\theta_G-\mu_G]+c_R R\cos[(\omega_s-\omega_R)t+\theta_R-\mu_R)]+c_B B\cos[(\omega_s-\omega_B)t+\theta_B-\mu_B]\}+\tfrac{1}{2}\{c_G G\cos[(\omega_s+\omega_G)t+\theta_G+\mu_G]+c_R R\cos[(\omega_s+\omega_R)t+\theta_R+\mu_R]+c_B B\cos[(\omega_s+\omega_B)t+\theta_B+\mu_B]\}$$

It should be noted that the fourth to the last terms of Equation 6 are the expressions for one-half the sum and difference terms which result from products, in accordance with the trigonometric fundamental identity which provides that $$\cos X\cos Y=\tfrac{1}{2}\cos(X-Y)+\tfrac{1}{2}\cos(X+Y)$$

Moreover, it is seen that the first three terms of Equation 6 constitute the brightness or "luminance" signal and may have values for $\omega_G$, $\omega_R$ and $\omega_B$ up to the total band passed by the receiver. The fourth term represents the lower side band of the color subcarrier and since, for the color component, $\omega_G$ etc. is generally less than $$\frac{\omega_s}{2}$$

it must lie between $$\frac{\omega_s}{2}$$

and $\omega_s$, unless balanced modulators are employed. The last term represents the upper side band of the color signal and lies between $\omega_s$ and the cutoff of the system.

At the receiver, this signal is divided into two paths, one of which feeds the entire signal except for some attenuation at the subcarrier frequency directly to the reproducing channel, while the second path leads to one or more demodulators.

Each receiver demodulator multiplies the signal by $K_x \cos(\omega_s t+\phi_x)$, so that the output of each demodulator is as follows:

$$(7)\quad H=S_T K_x\cos(\omega_s t+\phi_x)$$

where "$x$" is G, R or B, depending upon which color channel is under is under consideration and $\phi_x$ is the receiver demodulator angle.

In the case of a color signal of low enough frequency so that both side bands are present, the terms $(\omega_s-\omega_G)$, $(\omega_s-\omega_R)$ and $(\omega_s-\omega_B)$ which result from carrying out the multiplication of Equation 7 are greater than $$\frac{\omega_s}{2}$$

and do not pass through the low pass filters in the outputs of the demodulators. Thus, the signal reduces to the following after both sidebands are combined:

$$(8)\quad H_x=\frac{K_x}{2}[c_G G\cos(\omega_G t+\mu_G)\cos(\theta_G-\phi_x)+c_R R\cos(\omega_R t+\mu_R)\cos(\theta_R-\phi_x)+c_B B\cos(\omega_B t+\mu_B)\cos(\theta_B-\phi_x)]$$

Let it further be stated that $$\frac{K_G}{2}=d_G,\ \frac{K_R}{2}=d_R \text{ and } \frac{K_B}{2}=d_B$$

Since $G\cos(\omega_G t+\mu_G)=G_L$, the outputs of the separate demodulators having phase angles $\phi_G$, $\phi_R$ and $\phi_B$ may be represented as follows; if only the steady state condition is of interest:

$$(9)\quad (H_G=d_G[c_G G_L\cos(\theta_G-\phi_G)+c_R R_L\cos(\theta_R-\phi_G)+c_B B_L\cos(\theta_B-\phi_G)]$$
$$(H_R=d_R[c_G G_L\cos(\theta_G-\phi_R)+c_R R_L\cos(\theta_R-\phi_R)+c_B B_L\cos(\theta_B-\phi_R)]$$
$$(H_B=d_B[c_G G_L\cos(\theta_G-\phi_B)+c_R R_L\cos(\theta_R-\phi_B)+c_B B_L\cos(\theta_B-\phi_B)]$$

The phase angles $\phi_G$, $\phi_R$ and $\phi_B$ are either the phase angles of three separate demodulators or the phases of the output of a single demodulator at which the separate color signals are to appear.

Stated otherwise, it is the practice of the present invention to derive a new brightness signal by adding the output of the demodulator or demodulators, as the case may be, to the original brightness signal. Therefore, the resultant output of the demodulator or demodulators must be such to provide the difference between the two brightness signals.

From the foregoing development of the mathematical relationships between the transmitted signal and the action of the demodulator or demodulators, it is possible to write a series of nine equations which must be satisfied in order for the receiver to provide the proper signals in its output, as follows:

$$(10)\quad \begin{aligned} &(1-a_G=d_G c_G\cos(\theta_G-\phi_G)\\ &(1-a_R=d_R c_R\cos(\theta_R-\phi_R)\\ &(1-a_B=d_B c_B\cos(\theta_B-\phi_B)\\ &(-a_R=d_G c_R\cos(\theta_R-\phi_G)\\ &(-a_R=d_B c_R\cos(\theta_R-\phi_B)\\ &(-a_B=d_G c_B\cos(\theta_B-\phi_G)\\ &(-a_B=d_R c_B\cos(\theta_B-\phi_R)\\ &(-a_G=d_R c_G\cos(\theta_G-\phi_R)\\ &(-a_G=d_B c_G\cos(\theta_G-\phi_B)\end{aligned}$$

By way of summary, the definitions of the constants of equation 10 are as follows:

$c$=length of color vector (transmitter);
$\theta$=phase angle of color vectors (transmitter);
$\phi$=keying angles at receiver;
$a$=coefficient of the several component voltages of the brightness signal;
$d$=amplification of color signal at receiver; and R, G, B (subscripts) refer to the three component colors.

With the foregoing in mind, it will be noted that Fig. 8 illustrates vectorially a set of standards proposed tentatively by Panel No. 13 of the National Television Standards Committee. As shown, the color signal vectors have the following amplitudes and phases:

$$c_B=0.447,\ \theta=12.95^\circ$$
$$c_G=0.590,\ \theta_G=119.33^\circ$$
$$c_R=0.632,\ \theta_R=256.53^\circ$$

In addition, the luminance signal comprises the values set forth above, namely, $E_y'=0.59G+0.30R+0.11B$. The specific values are given in order to afford a concrete example to be used in describing the operation of Figs. 4 and 5 and are, of course, not to be considered as in any way limiting.

Referring now to Fig. 4, reference character 100 indicates a signal detector whose output terminal is connected via lead 102 to a brightness amplifier 104 which has as its function that of selecting and amplifying the brightness $E_y'$. The output of signal detector 100 is also coupled via a band pass filter 106 to each of demodulators 108 and 110. The filter 106 selects the color subcarrier, to the exclusion of the brightness information, as will be understood. It may be assumed further that, in accordance with a proposal set forth earlier, the color information was transmitted by modulating quadrature components of a subcarrier wave with the red and blue color-difference signals. Hence, there is provided a local oscillator 112 synchronized by suitable means such as a "burst"-controlled circuit (indicated diagrammatically by the block labeled "Color Sync Circuit") which furnishes a subcarrier frequency wave in quadrature to the demodulators 108 and 110. Thus, after filtering by low-pass filters 114 and 116, the outputs of demodulators 108 and 110 are, respectively, functions of the $(R-E_y')$ and $(B-E_y')$ or color-difference signals. These quantities are amplified, respectively, by amplifiers 118 and 120 and applied to adder 122. Also coupled to adder 122 is the amplified brightness signal, so that it should be apparent that the difference between the original (NTSC) brightness signal and the new brightness signal derived in accordance wtih the invention must necessarily be supplied by the paths of demodulators 108 and 110.

The color signal $C_s$, selected by filter 106, is amplified by any conventional means indicated at 124 and is combined with the new brightness signal across adder 126. As will now be illustrated, the amplifier color signal, when superimposed on the new brightness signal, is of such value as to be going through zero as to two of the colors at the time the third color is unity.

By substituting in Equations 10 the numerical values of the quantities which are known (i. e. $c_G$, $c_B$, $c_R$ and $\theta_G$, $\theta_B$, $\theta_R$), the following constants are derived:

$$d=1.295;\ a_G=0.342;\ a_R=0.232;\ a_{B_0}=0.424$$
$$\phi_G=149.95^\circ;\ \phi_R=235.95^\circ;\ \phi_B=2.71$$

This means that the new values of red, green and blue which constitute the brightness signal are such that the new brightness signal (available at the output terminal of adder 122) is in the form $$\text{New } E_y'=0.342G+0.232R+0.424B$$

Another mode of determining the necessary constants is one which may be viewed as follows:

From Equations 9 it is seen that the red contribution of the demodulators is $c_RR\cos(\theta_R-\phi_X)$ and must equal the difference between $a_R'R$ (the old proportion of red in the luminance signal) and $a_RR$ (the new proportion of red). The same reasoning is applicable to the other colors, so that the following equations may be written:

$$(11)\quad \begin{cases} \frac{K_x}{2}c_RR\cos(\theta_R-\phi_X)=a_R'R-a_RR \\ \frac{K_x}{2}c_GG\cos(\theta_G-\phi_X)=a_G'G-a_GG \\ \frac{K_x}{2}c_BB\cos(\theta_B-\phi_X)=a_B'B-a_BB \end{cases}$$

In these equations $c_R$, $c_G$ and $c_B$; $\theta_R$, $\theta_G$ and $\theta_B$ are known, as are $a_R'$, $a_B'$, $a_G'$ and $a_R$, $a_B$ and $a_G$.

If more than one demodulator is used as here in Fig. 4, there are an infinite number of combinations of the phase angles and gains at which they can be operated to produce the resultant derived above. If the phase angles are assumed to be 0° and 90°, as in the embodiment of the invention shown in Fig. 4, the gain of the respective demodulators 108 and 110 may be found in the following manner:

The sum of the outputs of the demodulators for each color must equal the amount of that color to be added to the old brightness signal to produce a new brightness signal. Therefore, where $K_0$ and $K_{90}$ equal the gain of the 0° and 90° modulators (110 and 108, respectively).

$$(12)\quad \begin{cases} \frac{K_0}{2}c_RR\cos(\theta_R-0^\circ)+\frac{K_{90}}{2}c_RR\cos(\theta_R-90^\circ)=a_R'R-a_RR \\ \frac{K_0}{2}c_GG\cos(\theta_G-0^\circ)+\frac{K_{90}}{2}c_GG\cos(\theta_G-90^\circ)=a_G'G-a_GG \end{cases}$$

There are two unknowns $K_0$ and $K_{90}$ and two equations so that the values of $K_0$ and $K_{90}$ can be determined. While the embodiment disclosed in Fig. 4 has two demodulators, it should be noted that if three demodulators are used, a third equation can be obtained by making a similar substitution in the Equation 11.

As has been explained, the difference between the old and new brightness signals is supplied by demodulators 108 and 110 and their associated amplifiers 118 and 120, so that the total amount added by them is $$0.314B-0.248G-0.068R.$$

Further, by reason of the fact that there cannot be separate gains for the component color signals in the kinescope, the gain "$d$" must be the same for all the color signals. Thus, since $d=1.295$, the amplification provided by the circuit indicated at 124 should be that amount, so that the color signal is amplified 1.295 times. Thus amplified and combined with the new brightness signal, the color signal is in condition for sequential "sampling" or keying by the kinescope 130. The combined new brightness signal and color signal are, as illustrated, coupled to the kinescope control grid 128.

In addition, it should be apparent that these are the angles at which keying pulses are to be applied to the cathode 132 of the kinescope. This condition of the combined new brightness signal and the amplified color signals is illustrated graphically by Fig. 7, wherein the waveforms B, R and G represent the blue, red and green color signals, respectively. The signal B is, as shown, superimposed on the new brightness (D. C.) level for blue of 0.424B, while the signal R is provided with an axis of 0.342R and the green signal G is superimposed on a brightness level of 0.232G. It may be readily observed that, at 2.71°, the green signal G and the red signal R are passing through zero, while the blue signal B is at unity value. Conversely, at 149.95°, B and R are zero and G is unity; and, finally, at 235.95°, B and G are zero and R is unity. Therefore, the signal which is actually applied to the kinescope grid being the composite of these three waveforms, will bear the blue, green and red information at 2.71°, 149.95° and 235.95°.

In order to accomplish the sequential "sampling," it is also necessary that the kinescope electron beam 134 (Fig. 4) be "switched" to the blue, green and red color phosphors at the same instants, that is, at 2.71°, 149.95° and 235.95°. Kinescope 130 may be of the type claimed in U. S. Patent 2,446,791, one figure of which is reproduced herein as Fig. 3 and, it may be assumed, for purposes of illustration, that the kinescope requires one volt of "switching" signal between its electrodes for deflecting the beam 134 upwardly and one volt of the opposite sign for downward deflection of the same amount. This switching voltage may be produced by any suitable means indicated generally at 136 as a source of color selecting wave which may be synchronized by the "color sync circuit." For the sake of completeness of the disclosure, Fig. 4 includes a showing of a "sync separator" 138 connected to the output of the signal detector 100 and performing the function of separating from the composite received signal the synchronizing pulses employed in controlling the deflection circuits (not shown) and color oscillator synchronizing bursts, none of which constitutes part of the present invention. These devices, however, are now well-known in the art and need not be described in any detail, although it is well to note that their functions are also necessary in the operation of the embodiments of Figs. 1 and 2 and would be included there in practice.

As stated, the color selecting or switching wave furnished by source 136, must be of such form as to be one volt positive at 2.71°, zero at 149.95° and one volt negative at 235.95°. The requisite sine wave may be determined through use of the following simultaneous equations:

$$A \cos (2.71° - \lambda) = 1 - q$$
$$A \cos \text{A}149.95° - \lambda) = -q$$
$$A \cos (235.95° - \lambda) = -1 - q$$

wherein A is the peak amplitude of the wave, $q$ is the D. C. level on which the wave is to superimposed, and $\lambda$ is the angle at which the wave's peak occurs.

Solving these equations provides the information that $A=1.20$, $q=0.194$ and $\lambda=50.6°$, thus rendering it possible to draw the wave 140 shown in Fig. 9 which, as shown, is superimposed on a D. C. axis of 0.194 volt, so that its positive peak (50.6°) is at 1.394 volts and its negative peak is at 1.006 volts. The sinusoidal voltage thus passes through one volt positive at 2.71°, zero at 149.95° and one volt negative at 235.95°.

As explained in detail in connection with Figs. 1 and 2, the "switching voltage" 140 is applied between switching electrodes 144 and 146. Simultaneously therewith, the source of color selecting wave 136 or other suitable source furnishes to kinescope cathode 132, via lead 148, a series of negative pulses 150 which are in synchronism with the screen switching signal 140 (i. e. pulses 150 occur at 2.71°, 149.95° and 235.95°). Thus, the electron beam 134 is keyed on for discrete intervals at these times and, as modulated by the color signal, is directed to the blue, green and red phosphors of screen 152.

Fig. 5 is a block diagram of another form of the present invention, similar to that of Fig. 4, with the exception that only a single demodulator is employed. This embodiment illustrates the simplicity with which the invention may be practiced by taking advantage of the fact that, in Fig. 4, the outputs of the two demodulators 108 and 110 are combined in adder 122. In view of this recombination, applicant has found that a single demodulator may perform the functions of two demodulators, if the proper phase and gain are provided it. This mode of operation will become apparent from the description of the circuit, wherein reference numerals identical to those of Fig. 4 are used to denote corresponding parts having the same function.

More particularly, therefore, this embodiment includes a signal detector 100 whose output is coupled to a brightness amplifier 104 which selects and amplifies the asymmetrical brightness signal $E_y'$ in its original "constant luminance" form, and this signal is applied to adder 122. The color signal $C_s$ is selected by band pass filter 106 and is applied to demodulator 160 which must, in accordance with the explanation of Fig. 4, provide the difference between the "constant luminance" brightness information and the desired new value $$0.424B + 0.342G + 0.232R$$

One way of viewing the problem is that of solving vectorially for the gain and phase of demodulator 160 which, in this case, is the resultant of the vector outputs of demodulators 108 and 110. Since the two demodulators were supplied with quadrature components of the subcarrier wave, the amplitude and phase of their resultant may be determined as follows:

$$\text{Resultant amplitude} = \sqrt{(\text{gain of } 108)^2 + (\text{gain of } 110)^2}$$

$$\text{Phase of resultant} = \text{arc tan } \frac{\text{gain of } 110}{\text{gain of } 108}$$

In the specific example of the NTSC proposed constant luminance signal, the resultant is found to have an amplitude of 0.728 and a phase angle of 5.2°, by substitution of the known quantities in the foregoing equations.

Another method of determining the gain and phase of demodulator 160 is through solving two of the Equations 11 wherein the values are known for $\theta_G$, $\theta_R$ and $\theta_B$, $c_G$, $c_R$ and $c_B$. Also, since there is only one demodulator, $\theta$ will be the same in both equations and $K_x$ will be the same for both. Thus, there are two equations and only two unknowns, since the remaining terms, that is, those including the $a_R'$, $a_R$ etc. are determined initially, as described above.

In view of the above, it should be apparent that the output of the color reference oscillator 112 (which is suitably synchronized by the color sync circuit) is coupled to demodulator 160 with a phase of 5.2°. The output of the demodulator is coupled through a low pass filter 162 to an amplifier 164 which has a gain, $d$ of 0.728. The output of amplifier 164 is the necessary differential signal which, when combined with the old $E_y'$ in adder 122, produces the new $E_y'$. The color signal $C_s$ is amplified by any conventional means indicated by reference numeral 124 by a factor of 1.295 (as in Fig. 4, since the signals are the same in both cases) and is superimposed on the new $E_y'$ brightness signal in adder 122, the composite output of which is coupled to the grid 128 of kinescope 130. The remainder of the circuitry of Fig. 5 is identical to that of Fig. 4, the keying voltage 150 for cathode 132 being supplied by source 136, which also couples the screen switching voltage 140 two electrodes 144 and 146. Both the cathode keying voltage 150 and switching voltage 140 are in the same form as those described for Fig. 4.

The present invention has been described in its two primary aspects in connection with block diagrams, in order to simplify the disclosure. Specific circuitry involved in the practice of the invention such, for example, as the brightness amplifiers, band pass and low pass filters and synchronous demodulators may be found illustrated in an article entitled "Compatible Color TV Receiver" by K. E. Farr in the January 1953 issue of "Electronics," page 98.

It will further be appreciated by those skilled in the art that, despite the fact that the invention has been explained in connection with the specific kinescope of Fig. 3, the basic principles herein, namely, the derivation from an asymmertical signal to one which may be sequentially sampled is equally applicable to other kinescopes wherein an electron beam is keyed on at such times that the signal corresponds to a given color and is directed to a colored light emitting device of that same color. One example of such a tube, in addition to that claimed by the present applicant in his patent cited above, is that described in detail in an article entitled "A One-Gun Shadow-Mask Color Kinescope" by R. R. Law which appeared in the October 1951 issue of "Proceedings of the IRE," page 1194. This tube employs a deflection field for rotating its el~ctron beam to the several color phosphors comprising each "picture element," and includes means for keying the electron beam sequentially at times corresponding to the individual colors as they appear in the color signal.

Other applications and modifications of the present invention will become apparent from the foregoing teachings and, for that reason, the specific embodiments disclosed are not to be taken by way of limitation.

Having thus described my invention, what I claim as new and desire to secure by Letters Patent is:

1. A color television receiver adapted to reproduce a color image from a composite electrical signal which includes a luminance signal made up of unequal proportions of information as to several colors and a carrier phase-modulated by information as to at least two of the colors making up said luminance signal which comprises: demodulator means having a predetermined amplitude characteristic; a source of reference wave of the frequency of said carrier and of a predetermined phase; means for applying a wave from said source to said demodulator means, means for applying said phase-modulated carrier to said demodulator means to cause said demodulator means to heterodyne said carrier and said reference wave; means for adding said phase-modulated carrier with said demodulator output and luminance signal to produce a new luminance signal with said carrier superimposed thereon; said demodulator means amplitude characteristic and phase being such that said new luminance signal is of such character that said carrier combined therewith passes through zero as to all of said colors but one at the instant that the remaining color has a finite value.

2. A color television receiver adapted to reproduce a color image from a composite electrical signal which includes a luminance signal made up of unequal proportions of information as to several colors and a carrier phase-modulated by information as to at least two of the colors making up said luminance signal which comprises; demodulator means having a predetermined gain; a source of reference wave of the frequency of said carrier and of a predetermined phase; means for applying a wave from said source to said demodulator means; means for applying said phase-modulated carrier to said demodulator means to cause said demodulator means to heterodyne said carrier and said wave; such that the output of said demodulator means is a function of said predetermined phase; means for adding said demodulator means output with said luminance signal; means for additively combining said phase-modulated carrier with said combined demodulator output and luminance signal; said demodulator means gain and phase being such that said demodulator output comprises a voltage which, when added to said luminance signal, produces a new luminance signal such that said carrier combined therewith passes through zero as to all but one of said colors at the instant that the remaining color has a finite value.

3. A television receiver as defined by claim 2 further characterized in that said new luminance signal is made up of unequal portions of information as to said several colors, said portions being individually different from the corresponding original portions.

4. A color television receiver adapted to reproduce a color image from a composite electrical signal which includes a luminance signal made up of unequal proportions of information as to several colors and a carrier phase-modulated by information as to at least two of the colors making up said luminance signal which comprises: demodulator means having a predetermined amplitude change characteristic; a source of reference wave of the frequency of said carrier and of a predetermined phase; means for applying a wave from said source to said demodulator means; means for applying said phase-modulated carrier to said demodulator means to cause said demodulator means to multiply said carrier and reference wave; means for adding said demodulator output with said luminance signal; means for additively combining said phase-modulated carrier with said combined demodulator output and luminance signal; said demodulator amplitude change characteristic and phase being such that said demodulator output comprises a voltage which, when added to said luminance signal, produces a new luminance signal symmetrical in form such that said carrier combined therewith passes through zero as to all but one of said colors at the instant that the remaining color has a finite value.

5. A color television receiver as defined by claim 4, wherein said carrier is characterized in that it bears information as to each of the several colors on equally displaced phases; and wherein said carrier is combined without alteration with said new luminance signal.

6. A color television receiver as defined by claim 4, wherein said color signal, as received, is asymmetrical in form and wherein said means for combining said carrier wave with said new luminance signal comprises a modulator means for deriving from said luminance signal as received and said output of said demodulator a new color signal which is symmetrical in form.

7. A color television receiver as defined by claim 4, wherein said received carrier wave is asymmetrical in form and wherein said means for combining said carrier with said new luminance signal comprises modulator means; and a second source of reference wave of the same frequency as said carrier wave; means for applying said luminance signal as received and said asymmetrical carrier in additively combined form to said modulator means; and means for applying a wave from said second source to said modulator means, said modulator means being adapted to derive from the signals applied to it a new color signal which is symmetrical in form.

8. A color television receiver as defined by claim 4, wherein said received carrier wave is asymmetrical in form and wherein said means for combining said carrier with said new luminance signal comprises a modulator means; means for applying said luminance signal as received and said asymmetrical carrier to said modulator means; means for applying to said modulator means a wave of alternating energy of the same frequency as said carrier wave; said modulator means having a predetermined amplitude characteristic and phase such that its output comprises a new color signal which is symmetrical in form.

9. A color television receiver having an image-reproducing device of the type wherein a single electron beam is keyed on at instants when a received composite signal corresponds to a particular color and wherein such beam is directed to a colored light emitting device of that same color simultaneously with the keying, said composite signal including a luminance signal made up of unequal proportions of information as to several colors and a carrier wave which is phase-modulated by information as to at least two of the colors making up said luminance signal which comprises: demodulator means having a predetermined gain; a source of reference wave of the frequency of said carrier and of a predetermined phase; means for applying a wave from said source to said demodulator means, means for applying said phase-modulated carrier to said demodulator means to cause said demodulator means to heterodyne said carrier and reference wave; means for additively combining said phase-modulated carrier with said demodulator output and luminance signal to produce a new luminance signal with said carrier superimposed thereon; said demodulator gain and phase being such that said new luminance signal is of such character that said carrier combined therewith passes through zero as to all of said colors but one at the instant that the remaining color has a finite value.

10. A color television receiver having an image-reproducing device of the type wherein a single electron beam is keyed on at instants when a received composite signal corresponds to a particular color and wherein such beam is directed to a colored light emitting device of that same color simultaneously with the keying, said composite signal including a luminance signal made up of unequal proportions of information as to several colors and a carrier wave which is phase-modulated by information as to at least two of the colors making up said luminance signal which comprises: demodulator means having a predetermined gain; a source of reference wave of the frequency of said carrier and of a predetermined phase; means for applying a wave from said source to said demodulator means; means for applying said phase-modulated carrier to said demodulator means for causing said demodulator means to heterodyne said reference wave and said carrier; means for additively combining said modulator means output with said luminance signal; means for combining said phase-modulated carrier with said combined demodulator output and luminance signal; said gain and phase of said demodulator means being such that said output comprises a voltage which, when added to said luminance signal, produces a new luminance signal symmetrical in form such that said carrier combined therewith passes through zero as to all but one of said colors at the instant that the remaining color has a finite value; a control electrode in said image-reproducing device; means for applying said combined new luminance signal and carrier to said control electrode; and means for keying on the electron beam in said reproducer at the instants that two of said colors are passing through zero simultaneously.

11. A color television receiver adapted to reproduce a color image from a composite electrical signal which includes a luminance signal in the form $a_RR+a_GG+a_BB$, where $a_R$, $a_G$ and $a_B$ are unequal and R, G, and B are electrical quantities regarding the individual colors of such image contributing to its luminance, said composite signal also including a carrier which is phase-modulated by information as to at least two of the colors making up said luminance signal, which comprises: demodulator means having a predetermined gain $K_x$; a source of reference wave of the frequency of said carrier and of a predetermined phase $\phi_x$; means for applying a reference wave from said source to said demodulator means; means for applying said phase-modulated carrier to said demodulator means to cause said demodulator means to heterodyne said carrier and said reference wave, such that the output of said demodulator means satisfies the expressions $$\frac{K_x}{2}c_RR\cos(\theta_R-\phi_X)=a_R'R-a_RR$$

$$\frac{K_x}{2}c_GG\cos(\theta_G-\phi_X)=a_G'G-a_GG$$

$$\frac{K_x}{2}c_BB\cos(\theta_B-\phi_X)=a_B'B-a_BB$$

where $c_R$, $c_G$ and $c_B$ are the amplitudes of the component color signals making up carrier and $\theta_R$, $\theta_G$ and $\theta_B$ are the phases of said component color signals; means for additively combining said demodulator output with said luminance signal and said phase-modulated carrier, whereby to produce a new luminance signal in the form $a_R'R+a_G'G+a_B'B$ where $a_R'$, $a_G'$ and $a_B'$ are such that said carrier combined with said new luminance signal passes through zero as to all but one of said colors at the instant that information as to the remaining color is represented thereby.

12. The invention according to claim 11 wherein said phase-modulated color carrier as received is asymmetrical in form and wherein said means for combining said carrier with said new luminance signal includes means for amplifying said carrier.

13. A color television receiver adapted to reproduce a color image from a composite electrical signal which includes a luminance signal in the form $a_RR+a_GG+a_BB$, where $a_R$, $a_G$, *and* $a_B$ are unequal constants and R, G and B are electrical quantities regarding the individual colors of such image contributing to its luminance, said composite signal including a carrier wave which is phase-modulated by information as to at least two of the colors making up said luminance signal, which comprises: demodulator means having a predetermined gain; a source of reference wave of the frequency of said carrier coupled to said demodulator means; means for applying said phase-modulated carrier to said demodulator means, said demodulator means being adapted to multiply said reference wave and said carrier; means for additively combining said phase-modulated carrier with said demodulator means output and said luminance signal whereby to produce a new luminance signal $a_R'R+a_G'G+a_B'B$ with said carrier superimposed thereon, where $a_R'$, $a_G'$ and $a_B'$ are, respectively, different from $a_R$, $a_G$ and $a_B$; said new luminance signal being such that said superimposed carrier bears information as to each of said colors at distinct times, the gain and phase of said demodulator means being predetermined in accordance with the expression:

$$\frac{K_x}{2}c_RR\cos(\theta_R-\phi_X)=a_R'R-a_RR$$

$$\frac{K_x}{2}c_GG\cos(\theta_G-\phi_X)=a_G'G-a_GG$$

$$\frac{K_x}{2}c_BB\cos(\theta_B-\phi_X)=a_B'B-a_BB$$

wherein $c_R$, $c_G$ and $c_B$ are the amplitude of the components of said color signals, $\theta_R$, $\theta_G$ and $\theta_B$ are the phases of said components, K represents the gain of said demodulator means, and $\phi_X$ the phase of said demodulator means.

14. A color television receiver having an image-reproducing device of the type wherein a single electron beam is keyed on at instants when a received composite signal corresponds to a particular color and wherein such beam is directed to a colored light emitting device of that same color simultaneously with the keying, said composite signal including a luminance signal in the form $a_RR+a_GG+a_BB$, where $a_R$, $a_G$ and $a_B$ are unequal and R, G and B are electrical quantities regarding the individual colors of such image, said composite signal also including a carrier wave which is phase-modulated asymmetrically by information as to at least two of the colors making up said luminance signal, which comprises: demodulator means having a predetermined gain; a source of reference wave of the frequency of said carrier coupled to said demodulator means; means for applying said phase-modulated carrier to said demodulator means, said demodulator means being adapted to heterodyne said wave and said carrier; means for adding said phase-modulated carrier with said demodulator means output and said luminance signal whereby to produce a new luminance signal $a_R'R+a_G'G+a_B'B$ with said carrier superimposed thereon, where $a_R'$, $a_G'$ and $a_B'$ are, respectively, different from $a_R$, $a_G$ and $a_B$; said new luminance signal being such that said superimposed carrier bears information as to each of said colors at distinct times, the gain and phase of the composite output of said demodulator means being predetermined in accordance with the expressions:

$$\frac{K_x}{2}c_RR\cos(\theta_R-\phi_X)=a_R'R-a_RR$$

$$\frac{K_x}{2}c_G G \cos(\theta_G-\phi_X)=a_G'G-a_G G$$

$$\frac{K_x}{2}c_B B \cos(\theta_B-\phi_X)=a_B'B-a_B B$$

wherein $c_R$, $c_G$ and $c_B$ are the amplitude of the components of said color signals, $\theta_R$, $\theta_G$ and $\theta_B$ are the phases of said components, K represents the gain of said demodulator means, and $\phi_X$ the gain of said demodulator means.

15. A color television receiver having an image-reproducing device of the type wherein a single electron beam is keyed on at instants when a received composite signal corresponds to a particular color and wherein such beam is directed to a colored light emitting device of that same color simultaneously with the keying, said composite signal including a luminance signal in the form $a_R R+a_G G+a_B B$, where $a_R$, $a_G$ and $a_B$ are unequal and R, G and B are electrical quantities regarding the individual colors of such image, said composite signal also including a carrier wave which is phase-modulated asymmetrically by information as to at least two of the colors making up said luminance signal, which comprises: demodulator means having a predetermined gain; a source of reference wave of the frequency of said carrier coupled to said demodulator means; means for applying said phase-modulated carrier to said demodulator means for causing said demodulator means to multiply said reference wave and said carrier; means for combining said phase-modulated carrier with said demodulator means output and said luminance signal whereby to produce a new luminance signal $a_R'R+a_G'G+a_B'B$ with said carrier superimposed thereon, where $a_R'$, $a_G'$ and $a_B'$ are respectively different from $a_R$, $a_G$ and $a_B$; said new luminance signal being such that said superimposed carrier bears information as to each of said colors at distinct times, the gain and phase of the composite output of said demodulator means being predetermined in accordance with the expressions:

$$\frac{K_x}{2}c_R R \cos(\theta_R-\phi_X)=a_R'R-a_R R$$

$$\frac{K_x}{2}c_G G \cos(\theta_G-\phi_X)=a_G'G-a_G G$$

$$\frac{K_x}{2}c_B B \cos(\theta_B-\phi_X)=a_B'B-a_B B$$

wherein $c_R$, $c_G$ and $c_B$ are the amplitude of the components of said color signals, $\theta_R$, $\theta_G$ and $\theta_B$ are the phases of said components, K represents the gain of said demodulator means and $\phi_X$ the phase of said demodulator means, means for switching the electron beam in said reproducer from light emitting device of one color to devices adapted to emit light of other colors represented by said received composite signal, said switching means being adapted to furnish a switching signal of sinusoidal form in accordance with the relationships:

$$A\cos(\phi_B-\lambda)=1-q$$
$$A\cos(\phi_G-\lambda)=-q$$
$$A\cos(\phi_R-\lambda)=-1-q$$

where A is the peak amplitude of said sinusoidal signal, $q$ is its D. C. level, and $\lambda$ is the angle at which its peak occurs.

16. In a color television receiver adapted to receive a composite signal including a component representative of image luminance and a modulated carrier wave whose phase and amplitude are representative of information regarding a plurality of image colors and wherein said composite signal has a finite amplitude as to a plurality of component colors at all times, apparatus for modifying said composite signal to form a new signal whose amplitude at selected instants is representative of only a single color, said apparatus comprising: a source of reference wave of the frequency of said carrier wave and of a selected phase; demodulator means for heterodyning said received carrier wave with said reference wave to produce an output signal; means for adding said demodulator means output signal to said received luminance component to produce a new luminance signal; and means for additively combining said new luminance signal with a wave corresponding to said received carrier wave to produce a new composite signal, said new luminance signal being of such character that said new composite signal is, at selected instants, representative of only a single color.

References Cited in the file of this patent

UNITED STATES PATENTS

| | | |
|---|---|---|
| 2,318,197 | Clark | May 4, 1943 |
| 2,558,489 | Kalfaian | June 26, 1951 |
| 2,580,903 | Evans | Jan. 1, 1952 |
| 2,634,324 | Bedford | Apr. 7, 1953 |
| 2,635,140 | Dome | Apr. 14, 1953 |
| 2,644,030 | Moore | June 30, 1953 |
| 2,648,722 | Bradley | Aug. 11, 1953 |
| 2,680,147 | Rhodes | June 1, 1954 |
| 2,713,607 | Rhodes | July 19, 1955 |
| 2,715,155 | Bryan | Aug. 9, 1955 |
| 2,725,418 | Sziklai | Nov. 29, 1955 |
| 2,744,952 | Lawrence | May 8, 1956 |
| 2,745,899 | Maher | May 15, 1956 |
| 2,754,356 | Espenlaub | July 10, 1956 |

OTHER REFERENCES

A Two-Color Direct-View Receiver for the RCA Color Television System, November 1949. (Copy in Div. 16.)

Principles of NTSC Compatible Color Television, Electronics, February 1952.